(12) United States Patent
Greer (10) Patent No.: US 10,429,408 B2
(45) Date of Patent: Oct. 1, 2019

(54) VEHICLE MONITORING MODULE

(71) Applicant: Danlaw Inc., Novi, MI (US)

(72) Inventor: Dale R. Greer, Novi, MI (US)

(73) Assignee: DANLAW INC., Novi, MI (US)

( * ) Notice: Subject to any disclaimer, the term of this patent is extended or adjusted under 35 U.S.C. 154(b) by 1019 days.

(21) Appl. No.: 14/296,299

(22) Filed: Jun. 4, 2014

(65) Prior Publication Data

US 2015/0355224 A1 Dec. 10, 2015

(51) Int. Cl.
*G01P 15/18* (2013.01)
*G01P 15/14* (2013.01)
*G01C 21/16* (2006.01)

(52) U.S. Cl.
CPC .............. *G01P 15/18* (2013.01); *G01C 21/16* (2013.01); *G01P 15/14* (2013.01)

(58) Field of Classification Search
CPC ......... G01P 15/18; G01P 15/14; G01C 21/16; G01C 21/00
See application file for complete search history.

(56) References Cited

U.S. PATENT DOCUMENTS

| 2009/0254279 A1* | 10/2009 | Han | G01C 21/16 |
| | | | 701/501 |
| 2009/0265671 A1* | 10/2009 | Sachs | G06F 3/017 |
| | | | 715/863 |
| 2012/0304767 A1* | 12/2012 | Howard | A42B 3/046 |
| | | | 73/504.03 |
| 2013/0054180 A1* | 2/2013 | Barfield | G01P 15/0891 |
| | | | 702/138 |

OTHER PUBLICATIONS

InvenSense Inc. MPU-6000 and MPU-6050 Product Specification Revisions 3.4, MPU-6000/MPU-6060 Product Specification Contents, Dated Aug. 19, 2013, XP055206970 URL:http://store.invensense.com/datasheets/invensense/MPU-6050_DataSheet_V3%204.pdf [retrieved on Aug. 10, 2015].*
NLREG, "Fit a plane to data points in 3D space" from Oct. 2013.*
International Search Report for International Application No. PCT/US2015/033926, dated Aug. 20, 2015.
MPU-6000 and MPU-6050 Product Specification Revisions 3.4, MPU-6000/MPU-6060 Product Specification Contents, dated Aug. 19, 2013, XP055206970, Retrieved from the Internet: URL:http://store.invensense.com/datasheets/invensense/MPU-6050_DataSheet_V3%204.pdf [retrieved on Aug. 10, 2015] the whole document.

* cited by examiner

*Primary Examiner* — Mohamed Charioui
*Assistant Examiner* — Catherine T. Rastovski
(74) *Attorney, Agent, or Firm* — Brinks Gilson & Lione (57) ABSTRACT

A portable system for monitoring vehicle driving conditions is provided. The system may include a processor, an accelerometer unit, and a gyroscope unit. The processor may be configured to determine a primary axis of the vehicle based on acceleration data from the accelerometer unit and the angular rate of change data from the gyroscope unit.

19 Claims, 12 Drawing Sheets

VEHICLE MONITORING MODULE

BACKGROUND

1. Field of the Invention

The present disclosure generally relates to a system for monitoring driving conditions of the vehicle.

2. Description of Related Art

Tracking driving conditions of a vehicle may be beneficial for many purposes. For example, insurance companies can use information about the driving conditions of the vehicle to determine the amount of risk that may be associated with any particular driver. Insurance companies may then use this information to adjust policy premiums. Currently, tracking systems may be difficult to calibrate within each vehicle and the results may be difficult to interpret.

In view of the above, it is apparent that there exists a need for an improved system for monitoring driving conditions of the vehicle.

SUMMARY

In satisfying the above need, as well as overcoming the enumerated drawbacks and other limitations of the related art, the disclosure provides a portable system for monitoring vehicle driving conditions. The system may include a processor, an accelerometer unit, and a gyroscope unit. The processor may be configured to determine a primary axis of the vehicle based on acceleration data from the accelerometer unit and the angular rate of change data from the gyroscope unit.

Further objects, features and advantages of the disclosed system will become readily apparent to persons skilled in the art after a review of the following description, with reference to the drawings and claims that are appended to and form a part of this specification.

DETAILED DESCRIPTION

Figure 1:
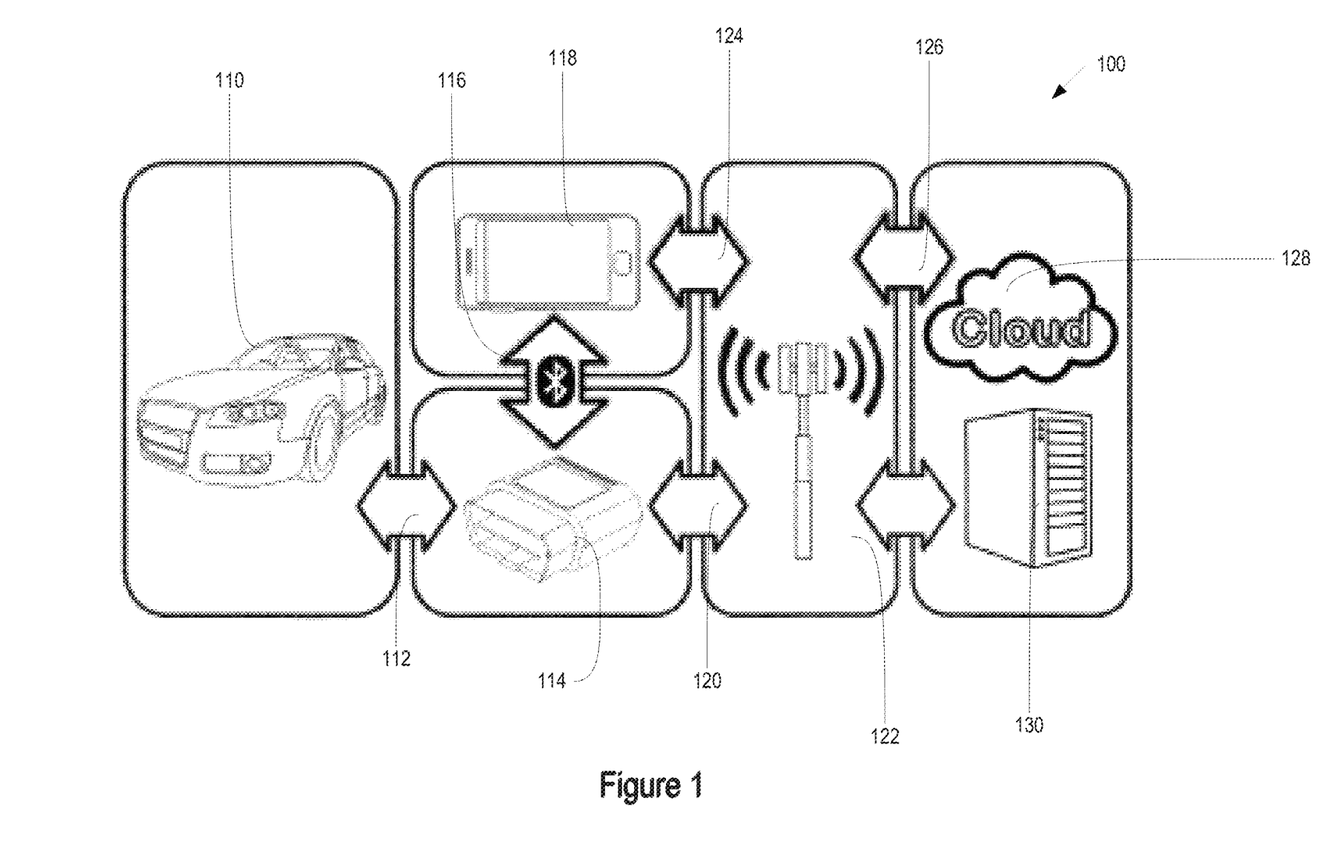
FIG. 1 is a block diagram of a system for tracking vehicle driving conditions.

Now referring to FIG. 1, the system 100 is provided for monitoring vehicle driving conditions. A vehicle 110 may be any typical automobile and may include an interface, for example an interface to an engine control module. In one implementation, the interface may be an OBDII interface. The OBDII interface is generally provided for diagnostics information of the vehicle. Often times, this interface may be connected to a diagnostic machine to determine errors that are detected by processors internal to the control system of the vehicle 110. However, the OBDII interface may also provide real time driving conditions such as vehicle speed. A portable monitoring device 114 may be connected to the vehicle 110 through the OBDII interface 112. Further, the portable monitoring device 114 may be provided power through the OBDII interface 112.

The portable monitoring device 114 may include a processor, an accelerometer unit, and a gyroscope unit. The processor, acceleration unit, and gyroscope unit may be enclosed within a housing unit including a connector configured to interface with the OBDII port. The portable monitoring device 114 may also include various wireless transceivers. The portable monitoring device 114 may include a Bluetooth transceiver. The Bluetooth transceiver may be configured to provide a Bluetooth connection 116 to a mobile device 118.

The mobile device 118 may be a mobile phone, a personal digital assistant, a tablet, or similar device. The mobile device 118 may receive calibration data from the monitoring device 114 over the Bluetooth connection 116. Further, the mobile device 118 may also receive driving condition data from the monitoring device 114. The driving condition data may be received in real time or in batches after the driving condition data has been collected. The driving condition data may comprise raw data, for example, accelerometer and gyroscope measurements that have not been transformed into the vehicle coordinate space units. The raw data may then be transformed into the vehicle coordinate space by the mobile device 118 using calibration data previously received from the monitoring unit 114. Alternatively, the monitoring unit 114 may provide transformed data in vehicle coordinate space directly to the mobile device 118.

The monitoring device 114 may also have a cellular transceiver to generate a cellular connection 120 with a cellular network 122. The monitoring device 114 may communicate any data collected including calibration or analyzed data through the cellular interface 120 to the cellular network 122. The cellular network 122 may include an interface 126 to a wide area network 128, for example to the Internet. A remote server 130 may receive the calibration data from the wide area network 128. Similar to the mobile device 118, the remote server 130 may also receive driving condition data from the monitoring device 114 through the cellular network 122. As such, the remote server 130 may also receive driving condition data from the monitoring device 114. The driving condition data may be received in real time or in batches after the driving condition data has been collected. The driving condition data may comprise raw data, for example, accelerometer and gyroscope measurements that have not been transformed into vehicle coordinate space. The raw data may then be transformed into vehicle coordinate space by the remote server 130 using calibration data previously received from the monitoring unit 114. Alternatively, the monitoring unit 114 may provide transformed data in vehicle coordinate space directly to the remote server 130. In some implementations, the remote server 130 may receive the calibration data and the driving condition data from the cellular network 122 directly through a cellular interface 132.

In addition, the mobile device 118 may also communicate with the remote server 130. The mobile device 118 may include a cellular transceiver to generate a cellular interface 124 with a cellular network 122. Accordingly, the calibration data or vehicle driving condition data may be provided from the mobile device 118 through the cellular interface 124 to the cellular network 122 and then to the remote server 130 either directly via interface 132 or through interface 126 and the wide area network 128.

Figure 2:
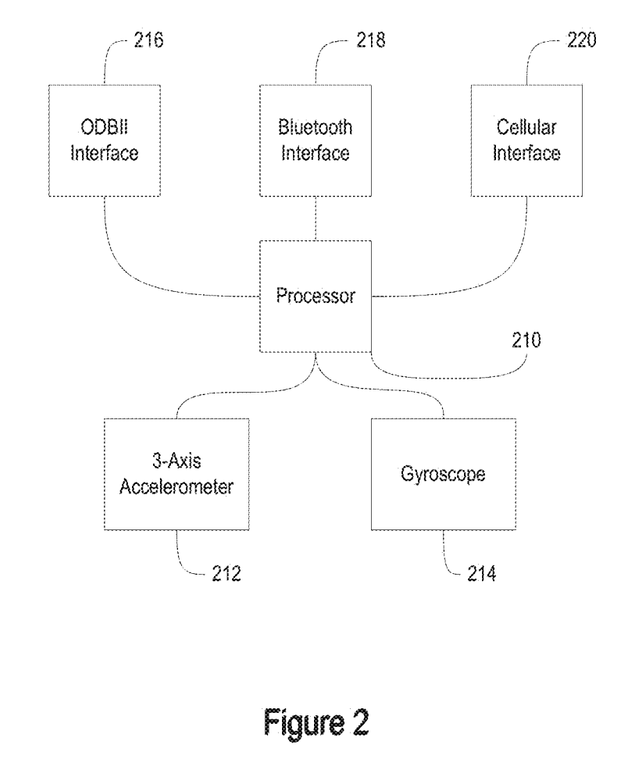
FIG. 2 is a block diagram of a portable monitoring unit.

Now referring to FIG. 2, a block diagram of a portable monitoring unit, for example the portable monitoring unit 114 from FIG. 1, is provided. The portable monitoring unit includes a processor 210. The processor 210 may be a standard microprocessor chip or maybe specially designed for the application and embedded in an ASIC or programmable gate array chip. The processor may be in communication with a three-axis accelerometer 212. The three-axis accelerometer may comprise three acceleration sensors. Each of the three acceleration sensors may be operable to measure linear acceleration. Each of the three acceleration sensors may measure linear acceleration along an axis that is perpendicular to the measuring axis of each of the other two acceleration sensors. The three acceleration sensors may be embedded in a single silicon chip and in some instances may be embedded on the same chip as the processor 210.

In addition, the processor 210 may be in communication with a gyroscope 214. The gyroscope 214 may be configured to measure an angular rate of the portable measuring unit. The gyroscope may include three angular sensors configured to measure an angular rate of change within a plane. The measuring plane of each angular sensor is perpendicular to and measures rotation around each angular sensor's axis. As such, utilizing the three angular sensors and overall angular rate of change of the portable monitoring unit may be determined in three-dimensional space. The gyroscope 214 may be embedded in the same silicon chip as the three-axis accelerometer 212. In addition, the three-axis gyroscope may be embedded in the same silicon chip as both the three-axis accelerometer 212 and/or the processor 210. Further, the accelerometer and the gyroscope may be provided in a fixed orientation relative to one another, for example on the same chip, and therefore may be pre-calibrated such that the orientation of the three-axis accelerometer 212 is known relative to each axis of the gyroscope 214.

The processor 210 may also be coupled to a number of communication interfaces. For example, the processor 210 may be in communication with an ODBII interface 216, a Bluetooth interface 218, and a cellular interface 220. Each of the ODBII interface 216, the Bluetooth interface 218, and the cellular interface 220 may be contained in separate components and connected to the processor 210, or alternatively one or more of the interfaces may be embedded on the same chip as the processor 210.

The processor 210 may be configured to receive driving condition data from the six axes of the accelerometer and gyroscope in real time. Further, the processor 210 may be configured to transmit the accelerometer and gyroscope data in real time over any of the interfaces, for example the ODBII interface 216, the Bluetooth interface 218, and/or the cellular interface 220. In other implementations, the processor 210 may be configured to manipulate the accelerometer data or gyroscope data prior to transmission over one or more of the interfaces. For example, the processor 210 may store calibration data such that the accelerometer and gyroscope data may be transformed into vehicle coordinates prior to transmission. Further, the processor 210 may receive certain vehicle condition information, for example vehicle speed information from the ODBII interface, and manipulate the accelerometer and/or gyroscope information based on the vehicle condition information prior to transmission. In some implementations, the processor 210 may calculate calibration data for the accelerometer and gyroscope, then transmit the calibration data to other devices over one or more of the interfaces. In some implementations, the portable monitoring unit may include a memory and the calibration data and/or the vehicle driving data may be stored on the portable monitoring unit and transmitted at a more convenient time.

Figure 3:
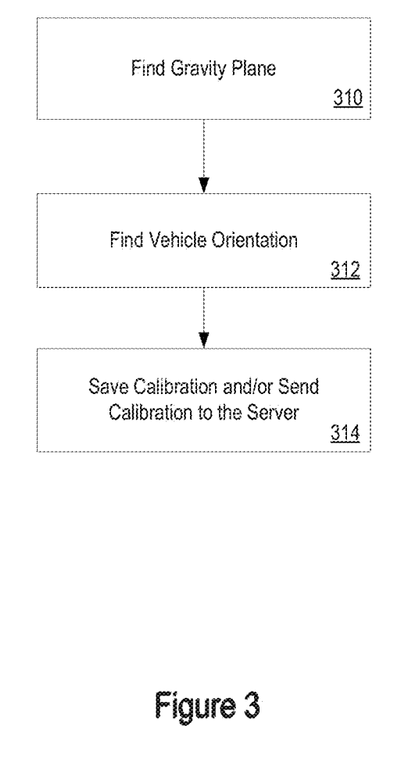
FIG. 3 is a flowchart illustrating a method for calibrating a portable monitoring unit.

Now referring to FIG. 3, a flowchart illustrating a method for calibrating the portable monitoring unit is provided. The processor of the portable monitoring unit may analyze the angular-rate data from the gyroscope and acceleration data from the accelerometer to determine a gravity direction that can be projected into a gravity plane (310). The gravity direction and/or gravity plane may be determined while the vehicle is at rest, because gravity will work on the vehicle regardless of vehicle movement. Further, gravity direction and/or plane may be determined by averaging multiple vehicle stops. The axis of gravity is typically not aligned with an axis of three-axis accelerometer. Accordingly, the acceleration due to gravity may be detected as acceleration in multiple axes of the three-axis accelerometer. As such the transformation between the gravity axis and the axes of the three-axis accelerometer are easier to determine when gravity is isolated (e.g. the vehicle is stationary).

In some implementations, the angular data may be used for determining the gravity direction and/or gravity plane when the vehicle is moving. For example, a plane of rotation may be determined as an estimate for the gravity plane based on the rate of angular rotation data from many turns over one or more trips. As such, the data may be averaged over time and driving conditions. The rate of angular change data may be fit to a plane using an algorithm to fit the given data, for example a best fit or averaging technique. Gravity will provide a bias force in one direction along the perpendicular vector. Accordingly, the direction of gravity relative to the plane can be easily determined. Once the gravity direction and/or gravity plane are determined, orientation of the vehicle relative to the gyroscope and accelerometer may be determined (312).

The primary vehicle axis may be the line of primary motion of the vehicle when the vehicle is traveling along a straight line. When the vehicle was traveling along a straight line and the vehicle is accelerating or braking, the three-axis accelerometer will detect a change in vehicle speed. The change in vehicle speed may be quantified by information provided through the ODBII interface. Once the primary axis of the vehicle is known, the transverse axis of the vehicle will be perpendicular to both the primary axis of the vehicle and the gravity axis.

In some implementations, the direction of the transverse axis may be determined based on the angular information from the gyroscope. For example, the gyroscope may provide angular rate of change information around three axes. Further, the angular rate of change information may be integrated to determine angular position information. The transverse axis may be particularly detectable during rapid turns. The more rapid the turn, the more centripetal force is generated in the vehicle. In one example, the rate of change of the angular rotation may be monitored. If the rate of change of angular rotation is above a threshold rate, the transverse axis may be determined based on the direction of the magnitude of acceleration during the time that the rate of change is above the threshold rate, the angular position during the time that the rate of change is above the threshold rate, or a combination of these parameters may be used to determine the transverse axis.

The magnitude of the acceleration may be the magnitude of the composite acceleration in all directions (e.g. Square root of $(Xa^2+Ya^2+Za^2)$), or the composite magnitude projected onto the gravity plane. For example, the Za may have gravity removed, (e.g. subtracting 1 g) or simply removing Za (e.g. $Xa^2+Ya^2$) if Z is aligned with gravity.

In another method, a set of points corresponding to time may be defined. The angular positions for each point along the time continuum may be stored. The angular positions along the drive may be assigned a value based on the rate of angular change. The value may be based on both the rate of angular change and the acceleration data from the accelerometers. For example, the rate of angular change may be weighted based on the magnitude of the composite acceleration or the composite acceleration projected into the gravity plane. For example, greater the centripetal force and/or or the faster the turn the greater the weighting. A line fit of the data points may be calculated based on the angular position and the assigned value.

Once the transform is determined between the accelerometer and/or the gyroscope coordinate frame (e.g. sensor coordinates) and the vehicle coordinates system, the calibration data may be stored or transmitted over one or more of the portable monitoring unit communication interfaces (314). In some implementations, the portable monitoring unit may communicate the calibration information to a server or remote device for backup or batch calculation of the vehicle driving information. In addition, the calibration may also be stored locally on the portable monitoring unit.

Figure 4:
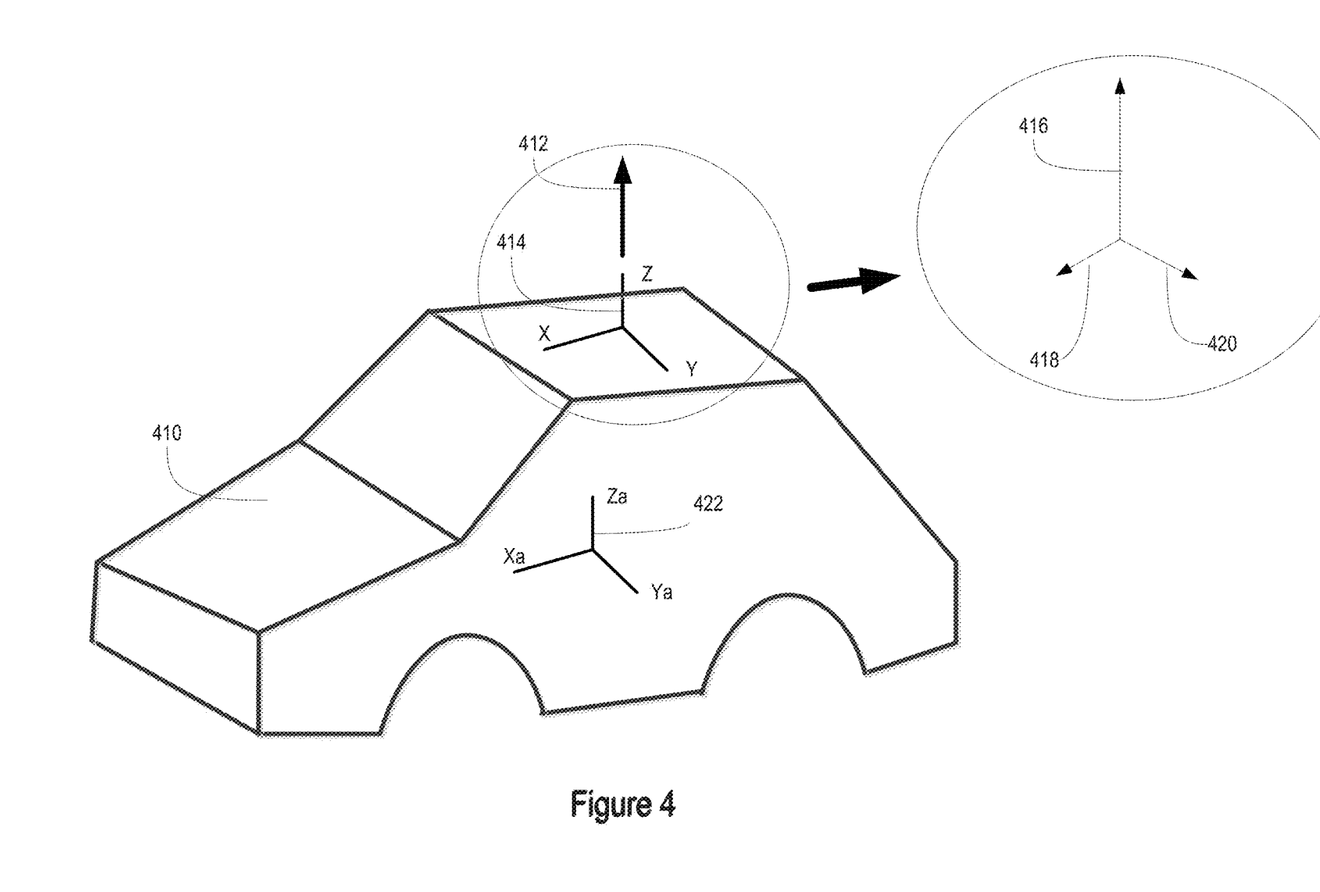
FIG. 4 is a diagram of a vehicle illustrating the effects of gravity.

Now referring to FIG. 4, a diagram of a vehicle is provided illustrating the effects of gravity. The vehicle 410 is illustrated at rest and on a flat surface. Arrow 412 represents the force on the vehicle due to gravity. The axes of the vehicle are denoted by reference numeral 414. The z-axis of the vehicle 414 is generally aligned with the gravity vector. However, the axes of the vehicle 414 are not necessarily aligned with the axes 422 of the accelerometer unit in the portable monitoring unit. The random orientation of axes between the vehicle and the portable monitoring unit are due to the various mounting and or interface constraints that are imposed by the wide range of vehicles to which the portable monitoring unit may need to interface. Even within models, manufacturing variation and vehicle wear would lead to misalignment between the portable monitoring unit in the vehicle. Accordingly, the acceleration due to gravity applied to the vehicle denoted by arrow 412 may be detected by the three-axis accelerometer as acceleration in more than one or all of the measurement axes. For example, the acceleration due to gravity may be detected as a large acceleration in the z-axis 416 and smaller accelerations in the x-axis 418 and y-axis 420 of the three-axis accelerometer.

Figure 5:
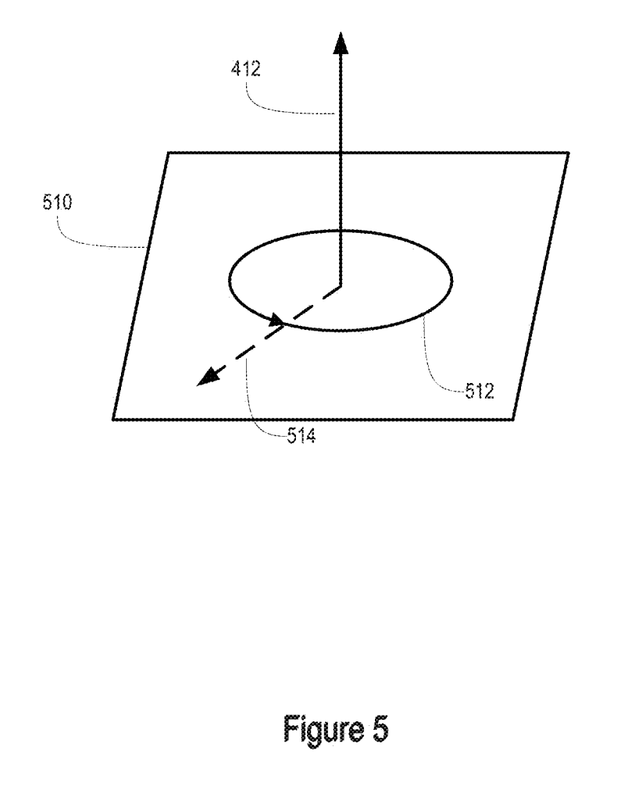
FIG. 5 is a diagram illustrating a gravity vector and plane of the vehicle.

Now referring to FIG. 5, a diagram is provided illustrating the gravity plane of the vehicle. Once the acceleration due to gravity is identified, as denoted by arrow 412, a plane 510 may be defined perpendicular to gravity. If the z-axis of the vehicle is generally aligned with the acceleration due to gravity, the primary axis 514 of vehicle motion should lie in the plane 510. However, the direction 512 of the primary axis 514 is unknown while the vehicle remains stationary. Alternatively, the gravity plane may be calculated by fitting rotational rate of change data from many turns during one or more trips, as described elsewhere in this application.

Figure 6:
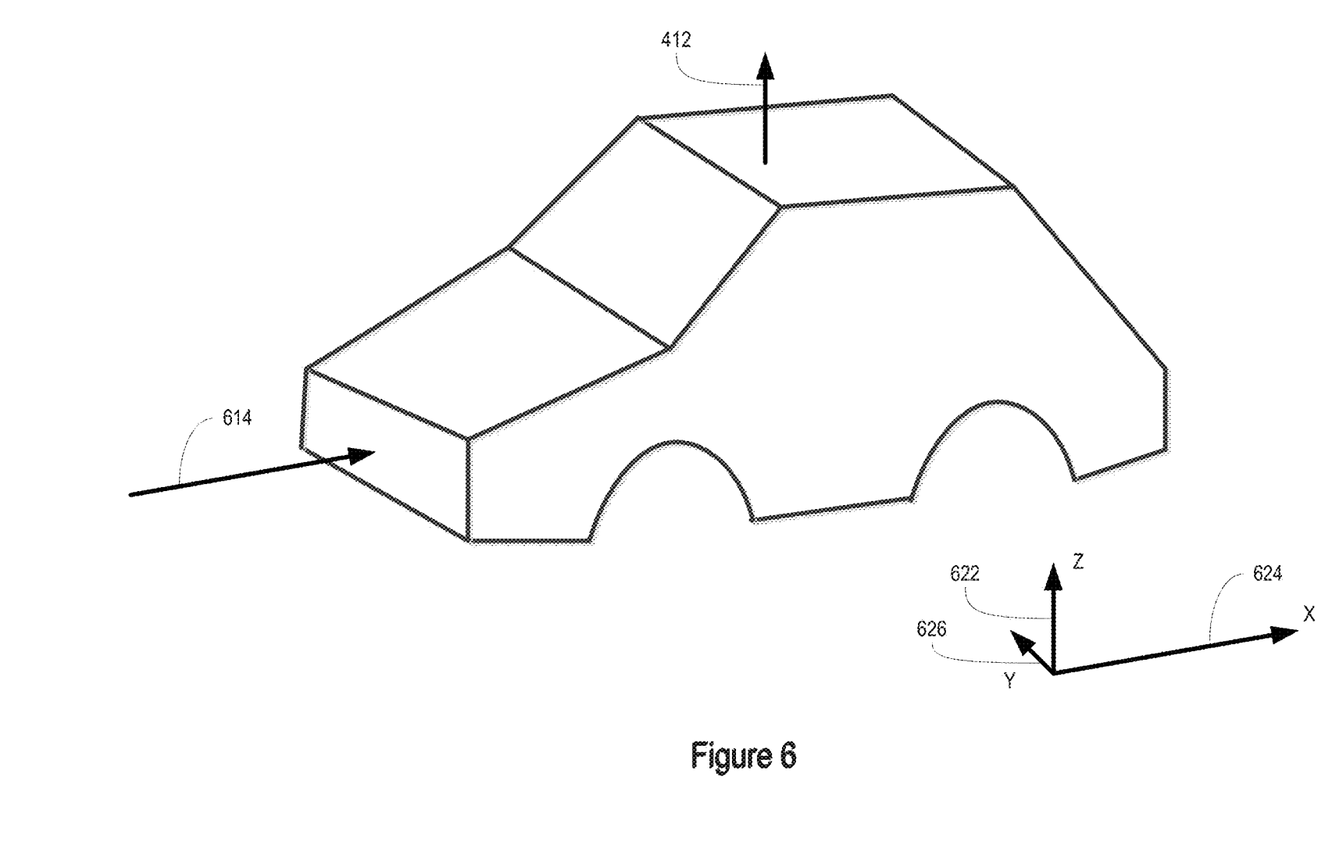
FIG. 6 is a diagram of the vehicle illustrating effects of deceleration.

Now referring to FIG. 6, a diagram of a vehicle illustrating the effects of deceleration is provided. While the vehicle is decelerating along a straight line, a force 614 will be introduced generally along the primary axis of the vehicle. However, the acceleration due to gravity 412 also remains present. As such, the three-axis accelerometer may detect an acceleration along the z-axis 622 that is primarily due to gravity and the acceleration in the negative x-axis 624 primarily due to the deceleration of the vehicle. However, the three-axis accelerometer may also experience acceleration in the y-axis 626. The acceleration in the y-axis 626 may be due to misalignment of the accelerometer axes and the vehicle axes or may also be due to other factors, for example tilting of the vehicle due to braking or a tilting the road surface relative to the direction of gravity and, therefore, the gravity plane. In these conditions, it may be beneficial to calculate the direction of gravity and/or the gravity plane using the gyroscope data and then identify the transverse axis based on the gyroscope data and the accelerometer data, as described elsewhere in this application. Further, calculating the direction of gravity and/or the gravity plane in this manner may be done with or without external speed information. As such, the portable monitoring unit may calculate a transformation between primary axis of the vehicle and the axes of the accelerometer. Once the primary axis or the transverse axis of the vehicle is known, the other axis may be easily calculated by determining the vector that is perpendicular to the known transverse axis and within the gravity plane.

Figure 7:
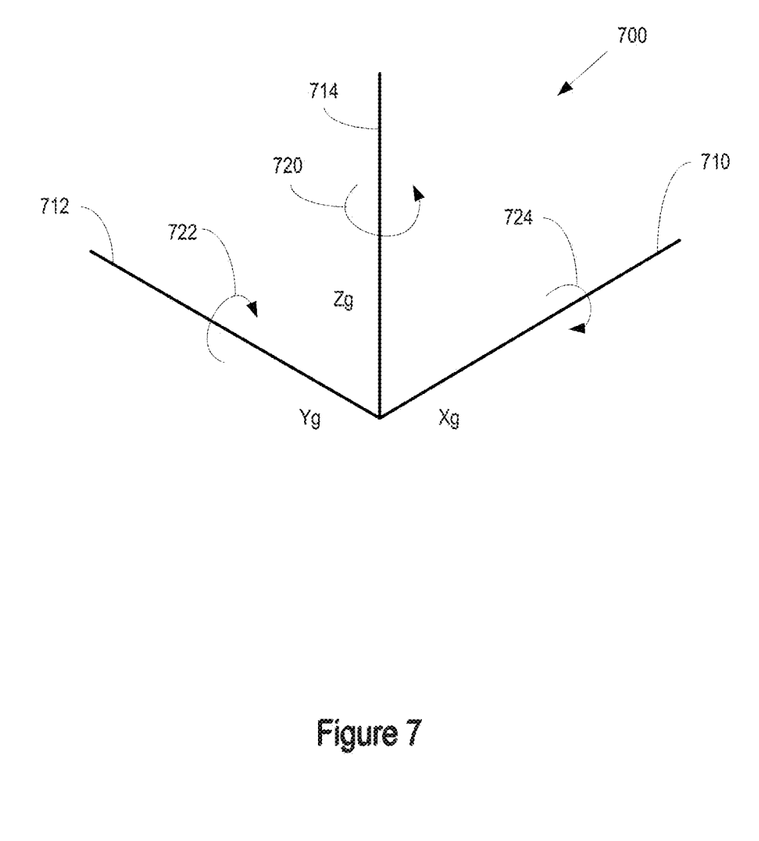
FIG. 7 is a diagram illustrating gyroscope measurements.

Now referring to FIG. 7, a diagram illustrating the gyroscope measurements is provided. The gyroscope may have a coordinate system 700. The coordinate system 700 may be aligned with the coordinate system of the three-axis accelerometer. In some implementations, the coordinate system of the gyroscope may be pre-calibrated with respect to the three-axis accelerometer such that a transformation between the coordinate system of the gyroscope and the coordinate system of the three-axis accelerometer are known. Further, the gyroscope and the three-axis accelerometer may be embedded on the same chip such that the readings from the three-axis accelerometer and the measurements from the three-axis gyroscope are provided in a common coordinate system. The coordinate system of the gyroscope may have an x-axis 710, y-axis 712, and z-axis 714. Further the gyroscope is configured to measure an angular rate of change around the three axes: x-axis 710, y-axis 712, and z-axis 714. As such, a first angular rate of change 720 may be measured around the z-axis 714. A second angular rate of change 722 may be measured around the y-axis 712. Finally, a third angular rate of change 724 may be measured around the x-axis 710. By determining the angular rate of change around each of these axes, the gyroscope can determine if and how much the vehicle is turning while any acceleration or deceleration is occurring.

Figure 8:
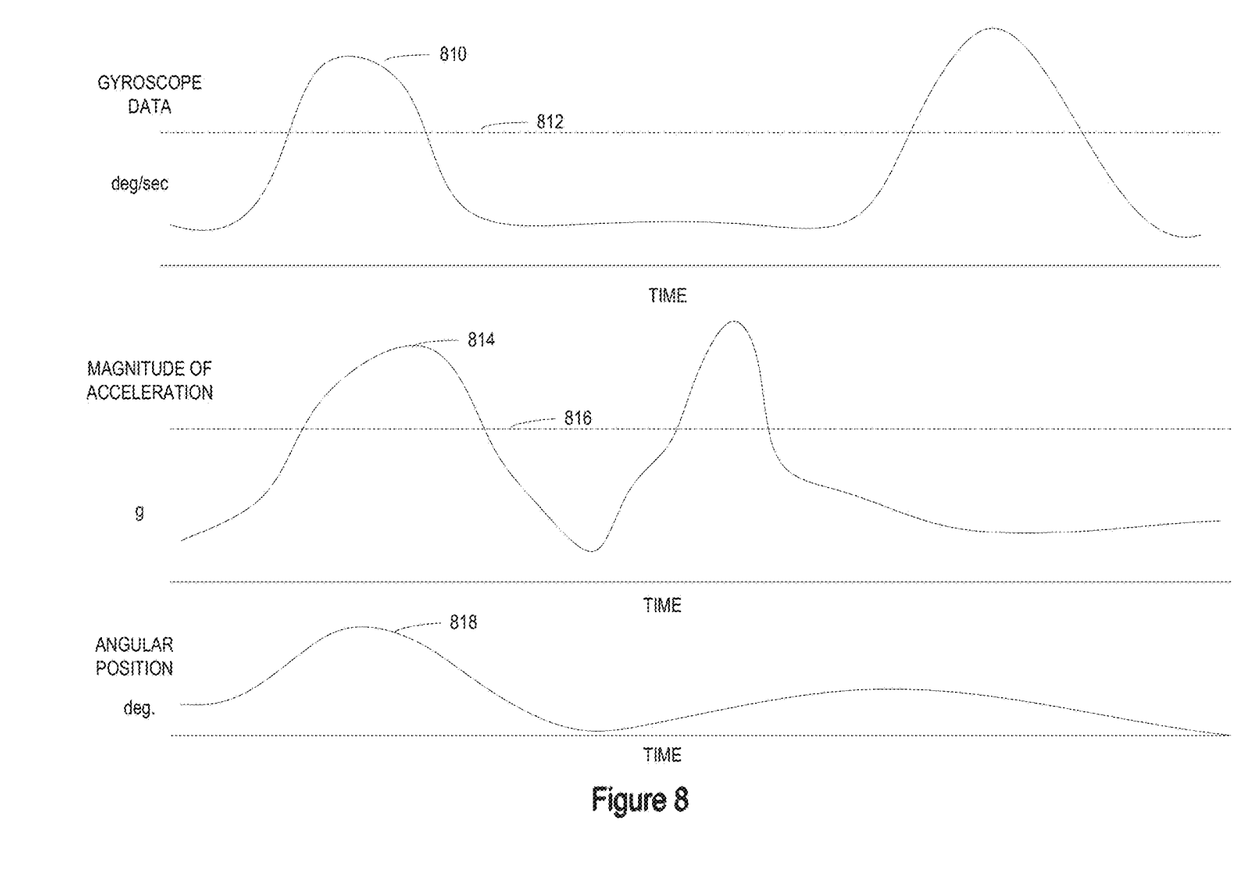
FIG. 8 is a diagram illustrating one method of determining vehicle orientation.

In some implementations, the direction of the transverse axis may be determined based on the angular information from the gyroscope. The direction of the transverse axis may be determined once gravity is known and may be calculated based on the gyroscope data and accelerometer or GPS data. The transverse axis may be particularly detectable during rapid turns. The more rapid the turn, the more centripetal force is generated in the vehicle. In one example, the rate of change of the angular rotation may be monitored as illustrated in FIG. 8. If the rate of change 810 of angular rotation is above a threshold rate 812, the transverse axis may be determined based on the direction of the magnitude of acceleration 814 during the time that the rate of change is above the threshold rate 812, the angular position 818 during the time that the rate of change 814 is above the threshold rate 812, or a combination of these parameters may be used to determine the transverse axis.

In some implementations, if the rate of change 810 of angular rotation is above a threshold rate 812 and the magnitude of acceleration 814 is above an acceleration threshold 816, then the transverse axis may be determined based on the direction of the magnitude of acceleration 814, the angular position 818, and/or a combination of these parameters during which the rate of change 814 is above the threshold rate 812 and/or the magnitude of acceleration 814 is above an acceleration threshold 816. The magnitude of the acceleration may be the magnitude of the composite acceleration in all directions with the gravity component removed from the composite acceleration.

In another method, a set of points corresponding to time may be defined. The angular positions for each point along the time continuum may be stored. The angular positions along the drive may be assigned a value based on the rate of angular change. The value may be based on both the rate of angular change and the acceleration data from the accelerometers. For example, the rate of angular change may be weighted based on the magnitude of the composite acceleration or the composite acceleration projected into the gravity plane. A line fit of the data points may be calculated based on the angular position and the assigned value.

Figure 9:
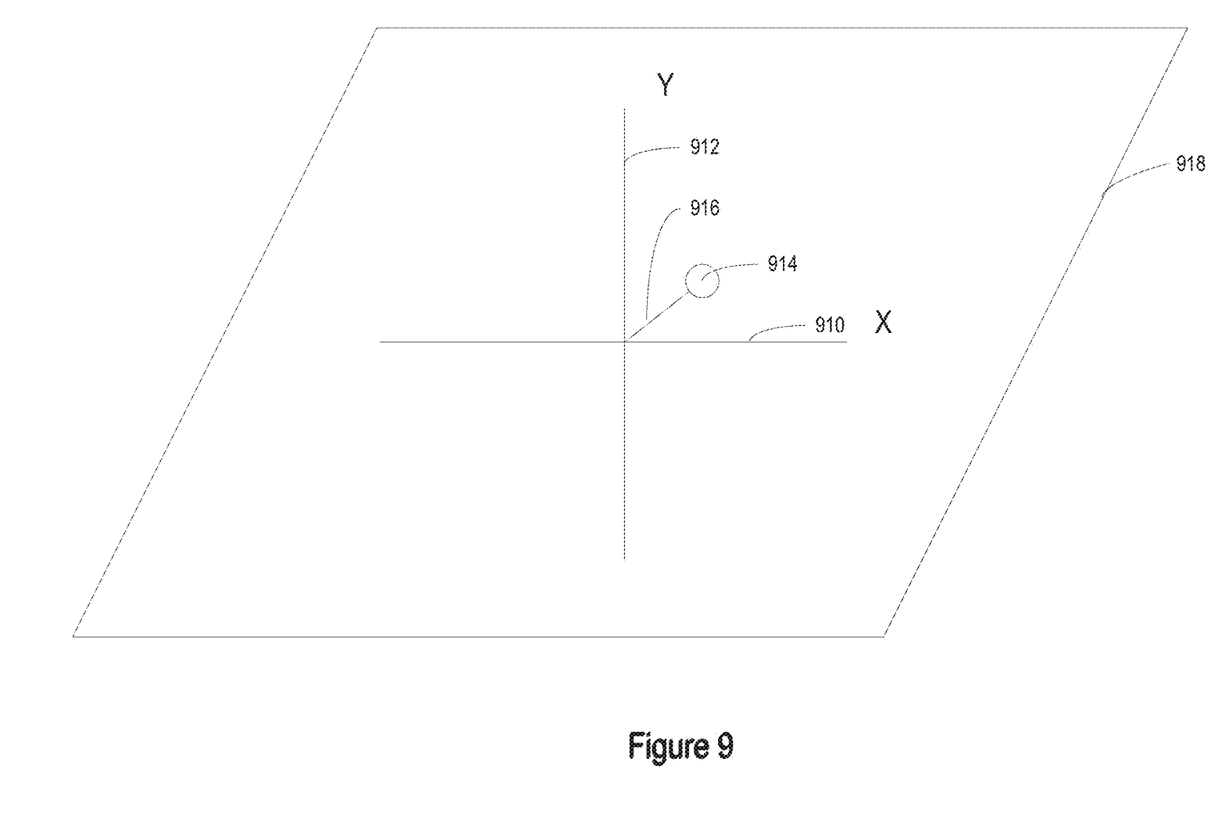
FIG. 9 is a diagram illustrating data used of determining vehicle orientation.
Figure 10:
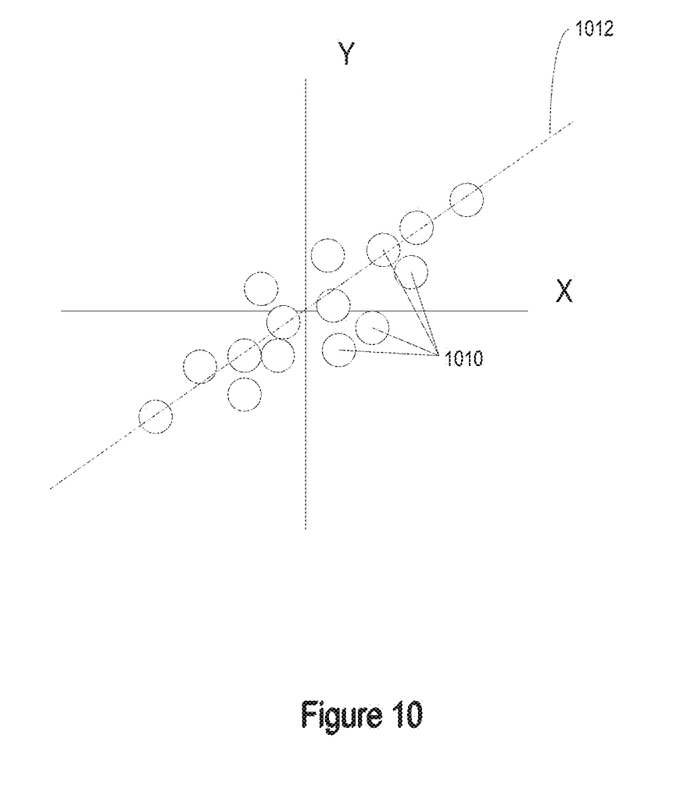
FIG. 10 is a diagram illustrating another method of determining vehicle orientation.

On example is illustrated in FIG. 9 and FIG. 10. Axes 910, 912 may be defined in the gravity plane 918. The acceleration vector 916 provides the measured acceleration as the vehicle turns with the gravity component removed. The coordinate 914 is derived from the acceleration vector 916. The value may be assigned to coordinate 914 by combining the rate of angular change and the force of the accelerometer within the gravity plane. The value may be visualized as a distance away from the origin, while the angular location may be based on the angular position or the direction of the composite acceleration projected into the gravity plane. Many of such sampled points 1010 may be used to calculate an average or line fit as described above to determine the transverse axis 1012 of the vehicle.

Figure 11:
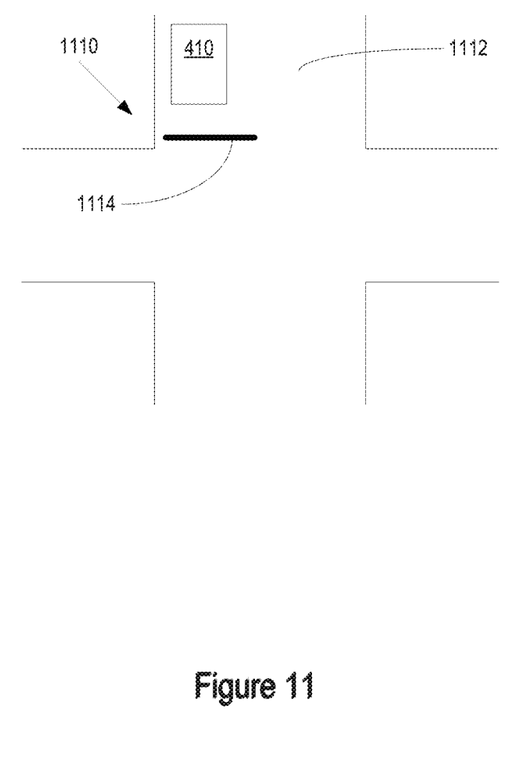
FIG. 11 is a diagram of a vehicle approaching an intersection.

Now referring to FIG. 11, a diagram of the vehicle approaching an intersection is provided. The vehicle 410 is illustrated driving on a road 1112. The vehicle 410 is approaching a stop line 1114 of an intersection 1110. As the vehicle 410 approaches the stop line 1114, the vehicle 410 will decelerate. The deceleration may be along a straight line leading up to the intersection. Once the vehicle 410 stops at the stop line 1114 and is then able to proceed, the vehicle 410 will accelerate. However, the vehicle 410 may accelerate along one of three paths. The vehicle may accelerate while turning right, continuing straight, or turning left. As such, in some circumstances deceleration can be more likely to occur along straight line than acceleration of the vehicle. In other circumstances, acceleration may provide a straighter path. While using deceleration data in some circumstances may be more reliable than acceleration data, limiting the use of data can significantly prolong the calibration process.

Figure 12:
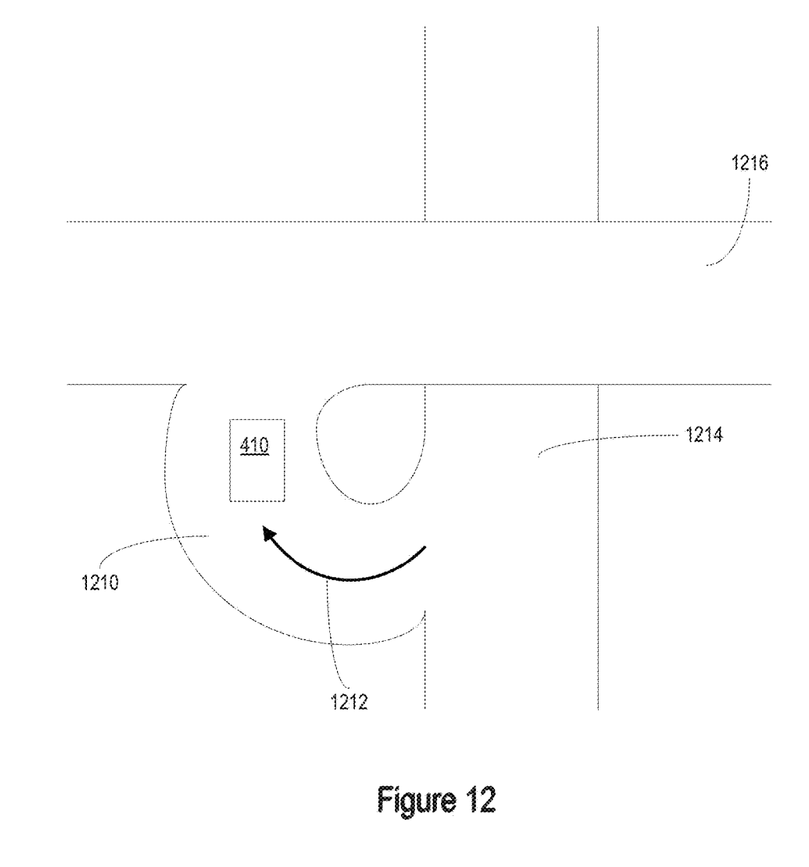
FIG. 12 is a diagram of a vehicle navigating a curved ramp.

Now referring to FIG. 12, a diagram of the vehicle navigating a curved ramp, such as a clover leaf is provided. The vehicle 410 may be navigating from a first road 1214 to a second road 1216 along a clover leaf 1210. As the vehicle 410 approaches the clover leaf 1210, the vehicle 410 will begin to decelerate slightly primarily along a straight line. As the vehicle 410 navigates along the clover leaf 1210, the vehicle 410 may further decelerate along a curved path as denoted by arrow 1212. Once the vehicle 410 begins to emerge on road 1216 the vehicle may then once again begin to accelerate. However, this case is significantly different from the linear deceleration shown in FIG. 11. Without the use of a gyroscope, the portable monitoring unit would not be able to determine that the acceleration/deceleration follows a curved path and the calibration data would be skewed.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory or other machine-readable medium. Thus, a product, such as a computer program product, may include a storage medium and computer readable instructions stored on the medium, which when executed in an endpoint, computer system, or other device, cause the device to perform operations according to any of the description above.

The processing capability of the architectures may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the processing described above. While various embodiments of the system have been described, it will be apparent to those of ordinary skill in the art that many more embodiments and implementations are possible within the scope of the disclosure. Accordingly, the application is not to be restricted except in light of the attached claims and their equivalents.

I claim:

1. A portable system for monitoring vehicle driving conditions of a vehicle comprising:
   a processor;
   an accelerometer unit in communication with the processor to provide accelerometer data for a first accelerometer axis, a second accelerometer axis, and a third accelerometer axis;
   a gyroscope unit in communication with the processor to provide gyroscope data for a first gyroscope axis, a second gyroscope axis, and a third gyroscope axis;
   a housing unit enclosing the processor, the accelerometer unit, and the gyroscope unit, the processor being configured to determine a gravity plane perpendicular to the gravity direction using rate of angular change data of the gyroscope for a plurality of turns when the vehicle is moving before determining a primary axis of the vehicle or a transverse axis of the vehicle, and after determining the gravity plane determining the primary axis or transverse axis of the vehicle based on the gravity plane the processor being configured to determine an orientation based on the primary axis or transverse axis of the vehicle relative to the accelerometer unit and the gyroscope unit based on the accelerometer data for the first accelerometer axis, the second accelerometer axis, and the third accelerometer axis and the gyroscope data for the first gyroscope axis, the second gyroscope axis, and the third gyroscope axis.

2. The system according to claim 1, wherein the processor is configured to determine a transformation between the accelerometer unit and the gyroscope unit coordinate system to a vehicle coordinate system during a real-time movement of the vehicle.

3. The system according to claim 1, wherein the accelerometer unit comprises a 3-axis accelerometer.

4. The system according to claim 1, wherein the accelerometer unit and the gyroscope unit are formed on a single semiconductor chip.

5. The system according to claim 1, wherein the processor is configured to determine the orientation of the vehicle based on an angular rate of change from the gyroscope data and a composite acceleration of the vehicle from the accelerometer data.

6. The system according to claim 5, wherein the processor is configured to determine the orientation of the vehicle based on the angular position when the angular rate of change is above a rate threshold.

7. The system according to claim 5, wherein the processor is configured to determine the orientation of the vehicle based on the angular position when the magnitude of the composite acceleration is above an acceleration threshold.

8. The system according to claim 1, wherein the processor is configured to determine the orientation of a vehicle based on an angular rate of change, from the gyroscope data, in a gravity plane weighted by a magnitude of a composite acceleration, from the accelerometer data, of a vehicle projected onto the gravity plane.

9. The system according to claim 1, wherein the processor is configured to determine a transverse axis based on a plurality of values, each value of the plurality of values being associated with an angular location of the vehicle at a time, and each value of the plurality of values being calculated based on an angular rate of change, from the gyroscope data, weighted by a magnitude of a composite acceleration, from the accelerometer data, of the vehicle at the time.

10. The system according to claim 1, wherein the processor is configured to determine a gravity plane based on rate of angular change data for a plurality of turns.

11. The system according to claim 10, wherein the processor is configured to determine a gravity plane based on plane fit for rate of angular change data for a plurality of turns.

12. A method for monitoring vehicle driving conditions for a vehicle, the method comprising:

identifying a gravity plane perpendicular to a gravity direction using rate of angular change data of a gyroscope for a plurality of turns when the vehicle is moving before determining a primary axis of the vehicle or a transverse axis of the vehicle, and after determining the gravity plane:

determining the primary axis or transverse axis of the vehicle based on the gravity plane;

collecting acceleration data for the vehicle from an accelerometer;

collecting an angular rate of change data for a first gyroscope axis, a second gyroscope axis, and a third gyroscope axis for the vehicle using the gyroscope;

calculating an orientation of a vehicle based on the gravity plane, angular rate of change data for a first gyroscope axis, a second gyroscope axis, and a third gyroscope axis and the acceleration data.

13. The method according to claim 12, wherein the processor is configured to determine the orientation of the vehicle based on the angular rate of change data for a first gyroscope axis, a second gyroscope axis, and a third gyroscope axis in the gravity plane and a composite acceleration of a vehicle.

14. The method according to claim 13, wherein the processor is configured to determine the orientation of the vehicle based on the angular position when an angular rate of change is above a rate threshold.

15. The method according to claim 13, wherein the processor is configured to determine the orientation of the vehicle based on the angular position when the magnitude of the composite acceleration is above an acceleration threshold.

16. The method according to claim 12, wherein the processor is configured to determine the orientation of the vehicle based on the angular rate of change weighted by the magnitude of the composite acceleration of the vehicle.

17. The method according to claim 12, wherein the processor is configured to determine the orientation of the vehicle based on the angular rate of change in the gravity direction weighted by the magnitude of the composite acceleration of the vehicle projected onto the gravity plane.

18. The method according to claim 12, wherein the processor is configured to determine the transverse axis based on a plurality of values, each value being associated with an angular location of the vehicle at a time, and each value being calculated based on the angular rate of change weighted by the magnitude of the composite acceleration of the vehicle at the time.

19. The method according to claim 12, wherein the processor is configured to determine the gravity direction based on a best fit of angular change data for a plurality of turns.

* * * * *